Oct. 4, 1960 A. J. MARSHALL 2,954,796
SAFETY TIRE RELIEF MECHANISM
Filed Oct. 29, 1958
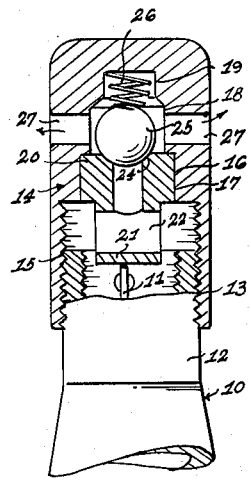
Fig. 1.
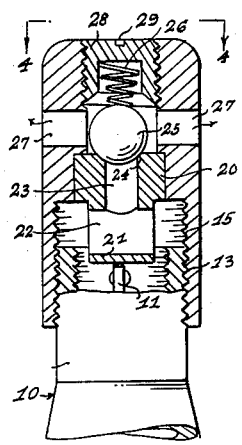
Fig. 2.
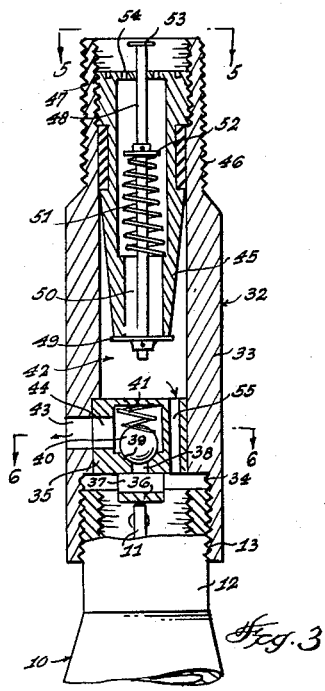
Fig. 3.
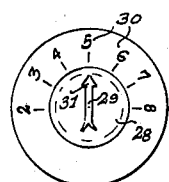
Fig. 4.
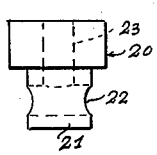
Fig. 7.
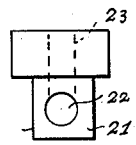
Fig. 8.
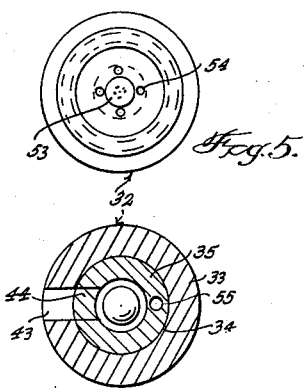
Fig. 5.
Fig. 6.
*INVENTOR.*
ANTHONY J. MARSHALL
BY *Victor J. Evans & Co.*
ATTORNEYS United States Patent Office 2,954,796
Patented Oct. 4, 1960

2,954,796
SAFETY TIRE RELIEF MECHANISM
Anthony J. Marshall, 251 N. I St., Livermore, Calif.
Filed Oct. 29, 1958, Ser. No. 770,465
1 Claim. (Cl. 137—226)

This invention relates to a gauge or relief mechanism, and more particularly to a relief mechanism for a tire.

The object of the invention is to provide a relief mechanism for use with a valve such as the valve of a vehicle tire whereby when the pressure of air in a tire exceeds a predetermined level, some of the air will be automatically discharged from the tire so that the air pressure within the tire is automatically controlled.

Another object of the invention is to provide an air tire relief mechanism which can be readily regulated or adjusted so that the amount of air pressure within a tire can be controlled as desired.

A further object of the invention is to provide a safety tire air relief mechanism which is extremely simple and inexpensive to manufacture.

Other objects and advantages will be apparent during the course of the following description.

In the accompanying drawings, forming a part of this application, and in which like numerals are used to designate like parts throughout the same, Figure 1 is an elevational view illustrating one form of the present invention, and with parts broken away and in section.

Figure 2 is a view similar to Figure 1, but illustrating a modification.

Figure 3 is a view similar to Figures 1 and 2 but showing a further modification.

Figure 4 is a sectional view taken on the line 4—4 of Figure 2.

Figure 5 is a sectional view taken on the line 5—5 of Figure 3.

Figure 6 is a sectional view taken on the line 6—6 of Figure 3.

Figure 7 is an elevational view illustrating the support member for use with Figure 1 or Figure 2.

Figure 8 is a view illustrating the support member of Figure 7, but taken at right angles thereto.

Referring in detail to the drawings, and more particularly to Figure 1 of the drawings, the numeral 10 indicates a valve such as a valve for a tire of a vehicle, and the valve 10 includes the usual stem 11 and housing 12, and the housing 12 is provided with a threaded end portion 13.

The relief mechanism of the present invention includes a body member which is indicated generally by the numeral 14, and the body member 14 is provided with an inner threaded recess 15 which threadedly engages the end portion 13 of the housing 12. The body member 14 is further provided with an elongated bore which is indicated generally by the numeral 16, and the bore 16 communicates with the chamber 15, the bore 16 including a first section 17, a second section 18 of smaller size, and a third section 19 of smallest size.

There is further provided a support member which is indicated generally by the numeral 20, Figures 1, 7 and 8, and the support member 20 includes an end portion 21 which is provided with an aperture 22, the support member 20 being seated in the first section 17 of the bore 16.

The support member 20 is also provided with a passageway 23 which communicates with the aperture 22, and the passageway 23 terminates in a valve seat 24. A ball 25 is mounted for movement into and out of opened and closed relation with respect to the valve seat 24, and a spring member 26 is arranged in engagement with the ball 25 for normally urging or maintaining the ball 25 in closed relation with respect to the valve seat 24 and passageway 23. The body member 14 is also provided with diametrically opposed ports 27 which communicate with the second section 18 of the bore 16.

Referring now to Figures 2 and 4 of the drawings, there is illustrated a modification wherein the numeral 28 indicates a plug which is rotatably and threadedly mounted in the body member 14, and the plug 28 is provided with a kerf or slot 29 as well as an arrow 31, and the arrow 31 is adapted to coact with scale markings or indicia 30 on the end of the body member 14, Figure 4. Thus, by rotating the plug 28, the tension on the adjacent coil spring 26 can be varied so that the ball 25 can be made to open or close at different pressures as desired and the arrow 31 and scale markings 30 provide a means of setting the device to operate at a desired pressure.

Referring now to Figures 3, 5 and 6 of the drawings, there is illustrated a further modification wherein the relief mechanism is indicated generally by the numeral 32. The relief mechanism 32 includes a body member 33 which is provided with a threaded chamber 34 that is adapted to threadedly engage the end portion 13 of the housing 12, and the numeral 35 indicates a support member which is mounted in the body member 33. The support member 35 includes an end portion 36 which abuts the valve stem 11, and the end portion 36 is provided with an aperture 37. A passageway 38 communicates with the aperture 37 and terminates in a valve seat 39, and a ball 40 is mounted for movement into and out of opened and closed relation with respect to the valve seat 39 and passageway 38. A spring member 41 is arranged in engagement with the ball 40 for normally closing off the valve seat and passageway 38. The body member 33 is provided with a longitudinally extending bore 42. As shown in Figure 3, there is provided in the body member 33 and in the support member 35, registering openings or ports 43 and 44.

The numeral 45 indicates a base piece which is arranged within the bore 42, and the outer end portion of the body member 33 is threaded externally as at 46. The base piece 45 is arranged in threaded engagement with an inner section 47 of the body member 33.

Movably supported in the base piece 45 is a shank 48 which has a closure or disc 49 on its inner end, and the closure 49 is mounted for movement into and out of opened and closed relation with respect to the hollow interior 50 of the base piece 45. A spring member 51 is mounted on the shank 48 for normally urging the closure 49 into closing relation, but when pressure is applied to the end 53 of the shank 48, the tension of the spring 51 can be overcome so as to permit the member 49 to move away from the adjacent end of the base piece 45. A stop member 52 on the shank 48 serves to retain the spring member 51 in its proper position on the shank. The base piece 45 is further provided with a wall member that has a plurality of spaced apart openings 54 therein, for a purpose to be later described.

From the foregoing, it is apparent that there has been provided a tire air relief mechanism which will serve to maintain air pressure in a tire at a desired level. For example when using the device of Figure 1, the air relief mechanism is adapted to be mounted on the housing 12 of the valve 10 and it is to be noted that the threaded chamber 15 of the body member 14 engages the threaded end portion 13 of the housing. With the parts arranged as shown in Figure 1, it will be seen that the ball 25 is maintained in closed position on the valve seat 24 and the end portion 21 of the support member 20 engages the conventional valve stem 11 so as to maintain the valve stem 11 depressed. When the air pressure in the tire exceeds a predetermined amount, the ball 25 will be moved from the position shown in Figure 1 against the pressure of the spring 26 so that the excessive air can pass out from the valve 10 and then pass through the chamber 15, and then through the aperture 22, and this air can then pass out through the passageway 23 and then out through either of the ports 27 to the atmosphere. After the air pressure in the tire is at the desired level, the spring 26 will return the ball 25 to its closed position as shown in Figure 1 so that no further air can escape from the tire.

In the arrangement shown in Figure 2, the operation is generally the same as described in connection with Figure 1. However, the plug 28 can be adjusted to different positions so as to vary the tension exerted by the spring 26 on the ball 25. This means that the air pressure necessary to open the ball 25 can be changed as desired so that an additional control means is provided. The plug 28 can be rotated by inserting a suitable tool such as a screw driver in the kerf 29, and an arrow 31 on the plug 28 coacts with scale markings 30 which provide a means for setting the device at a predetermined amount of pressure which may correspond to the calibrated scale markings.

In the modification of Figure 3, it is to be noted that the relief mechanism 32 is adapted to be arranged so that its threaded recess 34 engages the end portion 13 of the valve 10 and the portion 36 of the support member 35 abuts the valve stem 11 so as to maintain the valve stem 11 in its inward position. Then, when air builds up above a predetermined level in the tire, this air pressure will cause the air to pass out through the aperture 37 and then through the passageway 38 so as to lift or move the ball 40 from its seat 39 so that the spring 41 will be compressed. This air can then pass out through the registering ports 44 and 43 to the atmosphere. When the pressure drops in the tire, the spring 41 will again return the ball 40 to its closed position so that no further air can escape from the tire.

In the arrangement of Figure 3, it is not necessary to remove the relief mechanism 32 when putting air in the tire, but in the arrangement of Figure 1 or Figure 2, it is necessary to remove the gauge when putting air in a tire. Thus, in Figure 3 an air hose such as an air hose of conventional construction located in the usual filling station, can be arranged in engagement with the threaded portion 46 of the body member 33 and at the same time the portion 53 of the shank 48 will be engaged so as to shift the shank 48 whereby the closure 49 will move away from the inner end of the base piece 45. This will permit the incoming air to pass through the aperture 54 and then through the hollow interior 50, and then pass through the adjacent portion of the bore 42, and then through the opening 55, and this incoming air will then pass through the aperture 37 and then into the tire through the valve 10. When the air hose is disconnected from the body member 33, the spring 51 will return the member 49 to closed position with respect to the inner end of the base piece 45.

The parts can be made of any suitable material and in different shapes or sizes. Suitable gaskets or sealing members can be provided for preventing leakage of air in the device. The device is especially suitable, as for example when a person drives a car for a considerable length of time, and in hot weather, since pressure will tend to build up in the tire, but with the relief mechanism of the present invention being used, the air pressure will be automatically released so that blowouts or the like will be prevented, since excessive pressure in the tire will be prevented or eliminated. The air relief mechanism attaches onto the conventional valve of standard tubes and the device of Figure 2 can be set at any desired pressure and in all forms of the invention the automatic release mechanism will be actuated when the pressure builds up. The device can be readily removed when desired.

It is to be noted that with the device arranged on the inner tube valve, the end portion such as the end portion 21 or 36 will engage the valve stem 11 so as to depress the inner tube valve stem 11. Then, when pressure exceeds a safe amount, the ball such as the ball 25 or the ball 40 will be raised so as to permit excess pressure to be released through the air escape openings, and the spring engages the ball to hold the desired pressure. The plug 28 permits an adjustment to be made as previously described.

The slot 29 and arrow 31 can be used to indicate various approximate pressures for release of excess air.

The device of Figure 3 permits air to be added to the inner tube without removing the pressure release cap, and air enters the tube through one or more openings 55, and as air pressure rises above normal, the excess air pressure will be released. If desired, a regular valve cap may be screwed onto the top of the pressure release valve cap.

Minor changes in shape, size and rearrangement of details coming within the field of invention claimed may be resorted to in actual practice, if desired.

I claim:

In a relief mechanism for a valve of the type that includes a stem and a housing which is provided with a threaded end portion, said relief mechanism including a body member provided with a threaded recess for threadedly engaging said threaded end portion, there being a longitudinally extending bore in said body member, a support member arranged in said bore and having an end portion abutting said stem, there being an aperture in the end portion of said support member, said support member being provided with a passageway which communicates with said aperture and which is arranged at right angles with respet to said aperture, said passageway terminating in a valve seat, a ball mounted for movement into and out of opened and closed relation with respect to said valve seat, a spring member arranged in engagement with said ball, there being registering ports in said body member and support member downstream of said ball, there being an elongated opening through said support member, said body member including an end which is threaded externally, a base piece having a longitudinal passage therethrough seated in the bore of said body member adjacent said last named externally threaded end, a shank movably supported in said base piece, a closure mounted on the inner end of said shank, a coil spring connected at one end to said shank and abutting a shoulder in the base piece at its other end, said base piece including a wall member spanning the longitudinal passage therethrough and provided with a plurality of spaced apart openings therethrough.

References Cited in the file of this patent

UNITED STATES PATENTS

| | | |
|---|---|---|
| 843,525 | Frey | Feb. 5, 1907 |
| 1,144,499 | Owens | June 29, 1915 |
| 1,153,401 | Milne | Sept. 14, 1915 |
| 1,246,131 | Marston | Nov. 13, 1917 |
| 1,911,125 | Miller | May 23, 1933 |

FOREIGN PATENTS

| | | |
|---|---|---|
| 662,080 | France | Aug. 25, 1923 |
| 487,756 | Great Britain | June 24, 1938 |
| 59,191 | France | Dec. 23, 1953 |